(No Model.) 6 Sheets—Sheet 2.

W. SPEAR.
MACHINE FOR HARVESTING, PICKING, AND HUSKING CORN.

No. 375,016. Patented Dec. 20, 1887.

Witnesses:
M. C. Halsted
Guy L. DeMotte

Inventor:
Warren Spear
by John J. Halsted & Son
his Attys.

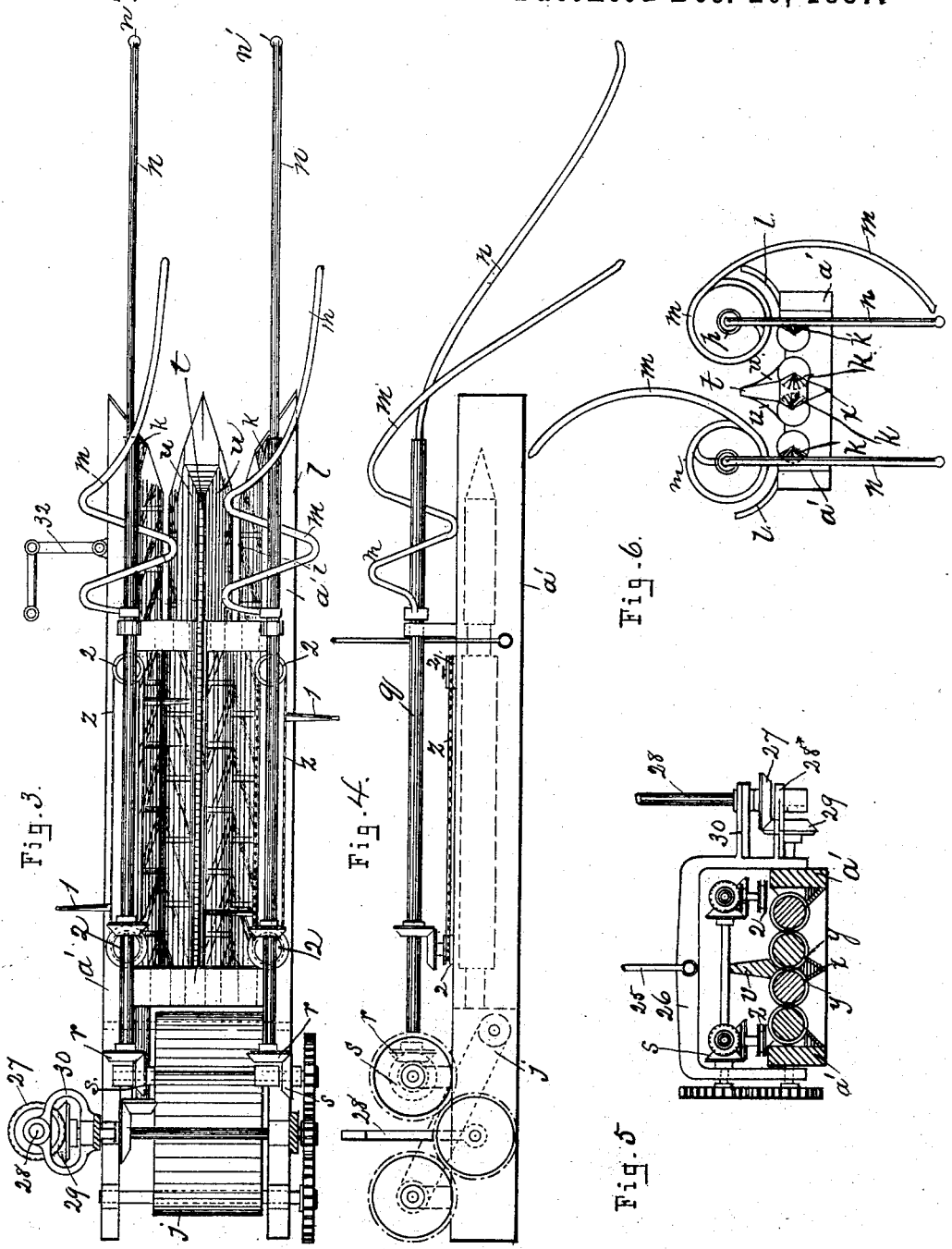

(No Model.)   6 Sheets—Sheet 4.
W. SPEAR.
MACHINE FOR HARVESTING, PICKING, AND HUSKING CORN.
No. 375,016. Patented Dec. 20, 1887.
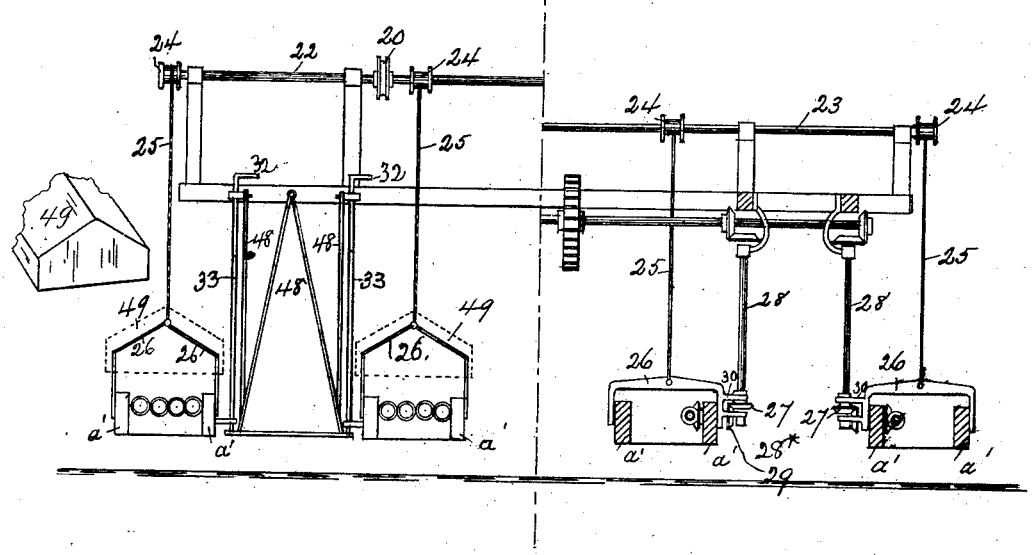
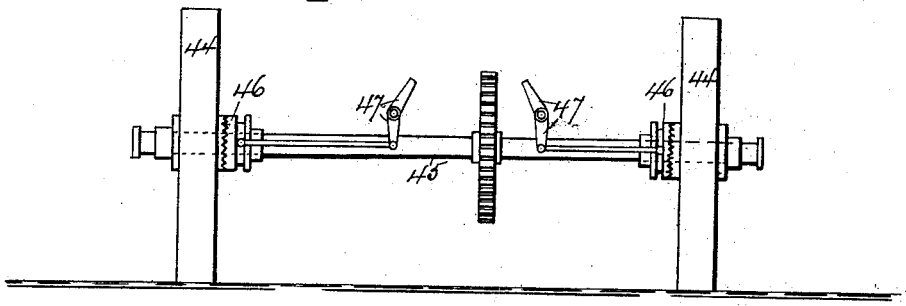
Witnesses:
M. C. Halsted.
Guy L. DeMotte.
Inventor:
Warren Spear
by John J. Halsted & Son
his Attys.

(No Model.) 6 Sheets—Sheet 5.
W. SPEAR.
MACHINE FOR HARVESTING, PICKING, AND HUSKING CORN.
No. 375,016. Patented Dec. 20, 1887.
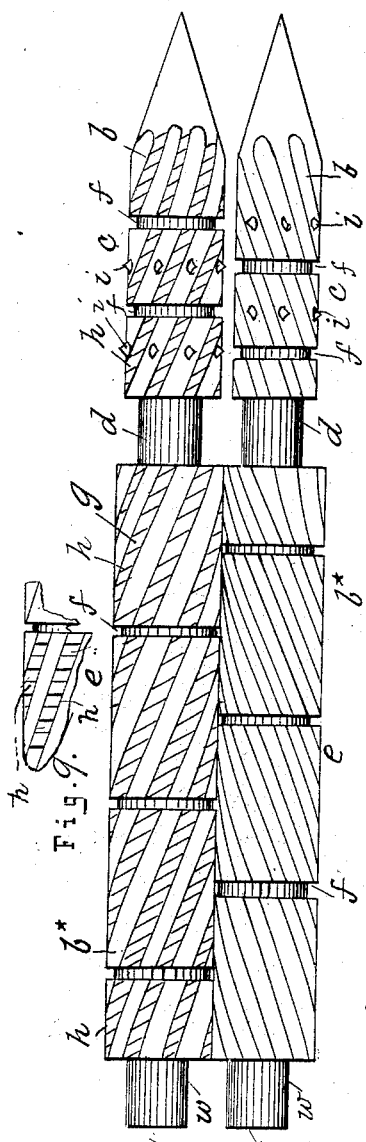
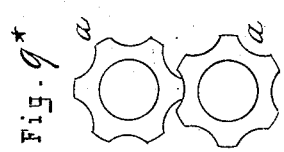
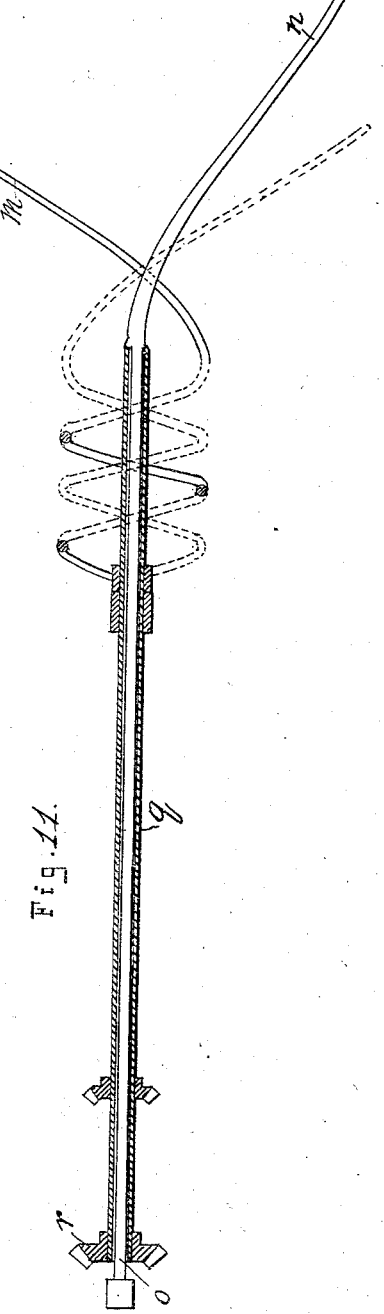
WITNESSES
M. C. Halsted
Guy. L. DeMotte.
INVENTOR
Warren Spear
by John J. Halsted & Son
his Attys.

(No Model.) 6 Sheets—Sheet 6.

W. SPEAR.
MACHINE FOR HARVESTING, PICKING, AND HUSKING CORN.

No. 375,016. Patented Dec. 20, 1887.

Attest.
William T. Norton
A. M. Paxton

Inventor
Warren Spear
by John J. Halsted & Son
his Attys.

UNITED STATES PATENT OFFICE.

WARREN SPEAR, OF AURORA, ILLINOIS.

MACHINE FOR HARVESTING, PICKING, AND HUSKING CORN.

SPECIFICATION forming part of Letters Patent No. 375,016, dated December 20, 1887.

Application filed April 21, 1884. Serial No. 128,788. (No model.)

*To all whom it may concern:*

Be it known that I, WARREN SPEAR, of Aurora, in the county of Kane and State of Illinois, have invented certain new and useful Improvements in Machines for Harvesting, Picking, and Husking Corn; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention is a further improvement upon the construction shown in my patent, No. 235,038, dated November 30, 1880; and it relates to the picking and husking rollers and to their auxiliary devices; to a device for assisting the rollers in carrying back the ears of corn to the apron; to a special construction of a revolving gatherer in conjunction with a stationary one; to adaptations for working the machine either by horses or by an engine and boiler on the machine, and such that the corn may be picked and husked in the row or when the corn is in the stack or shock and the machine being stationary; to picking up stalks that are down, whether they lie across the rows or otherwise, and to other features, as will presently appear.

Figure 1:
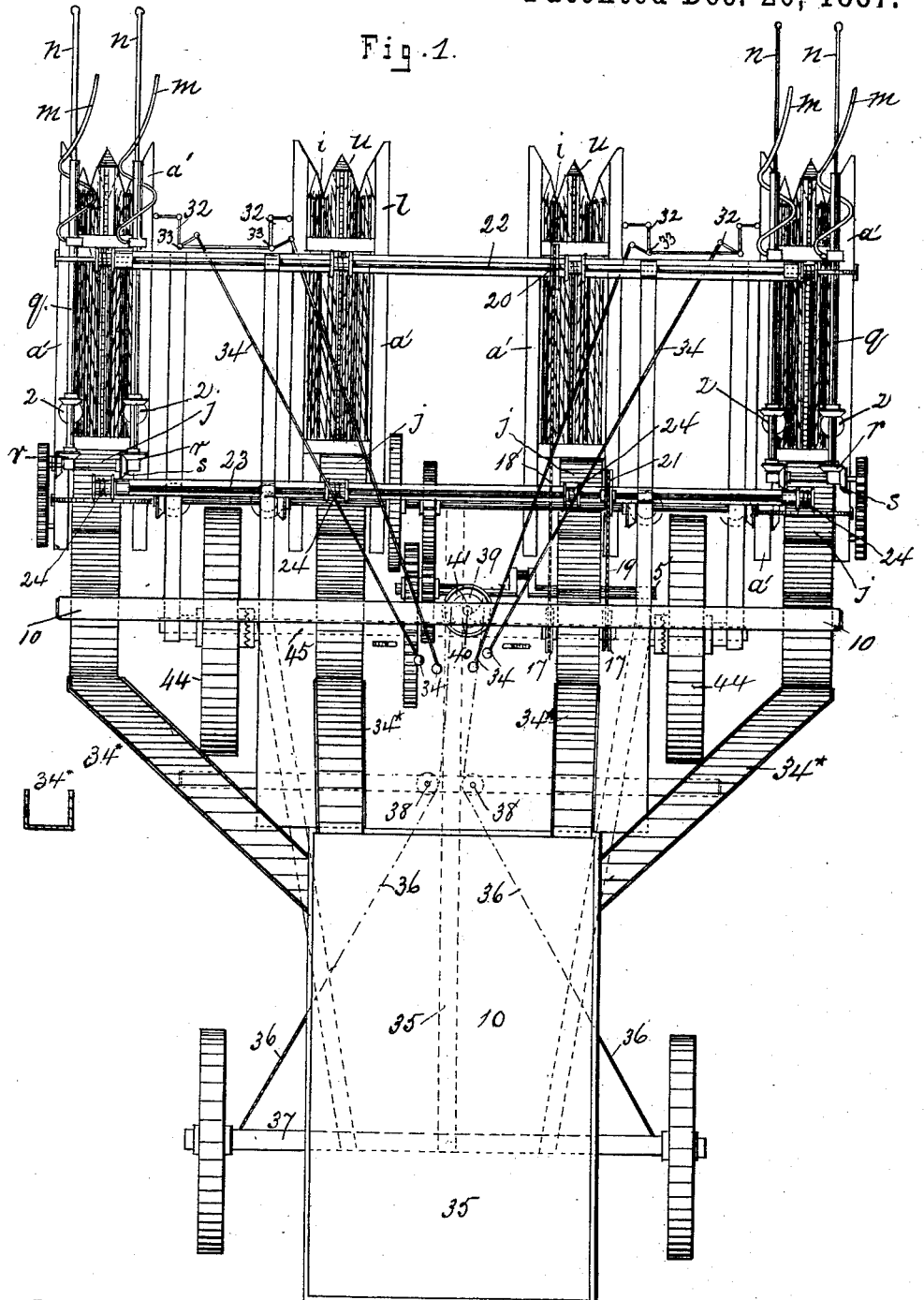
Figure 2:
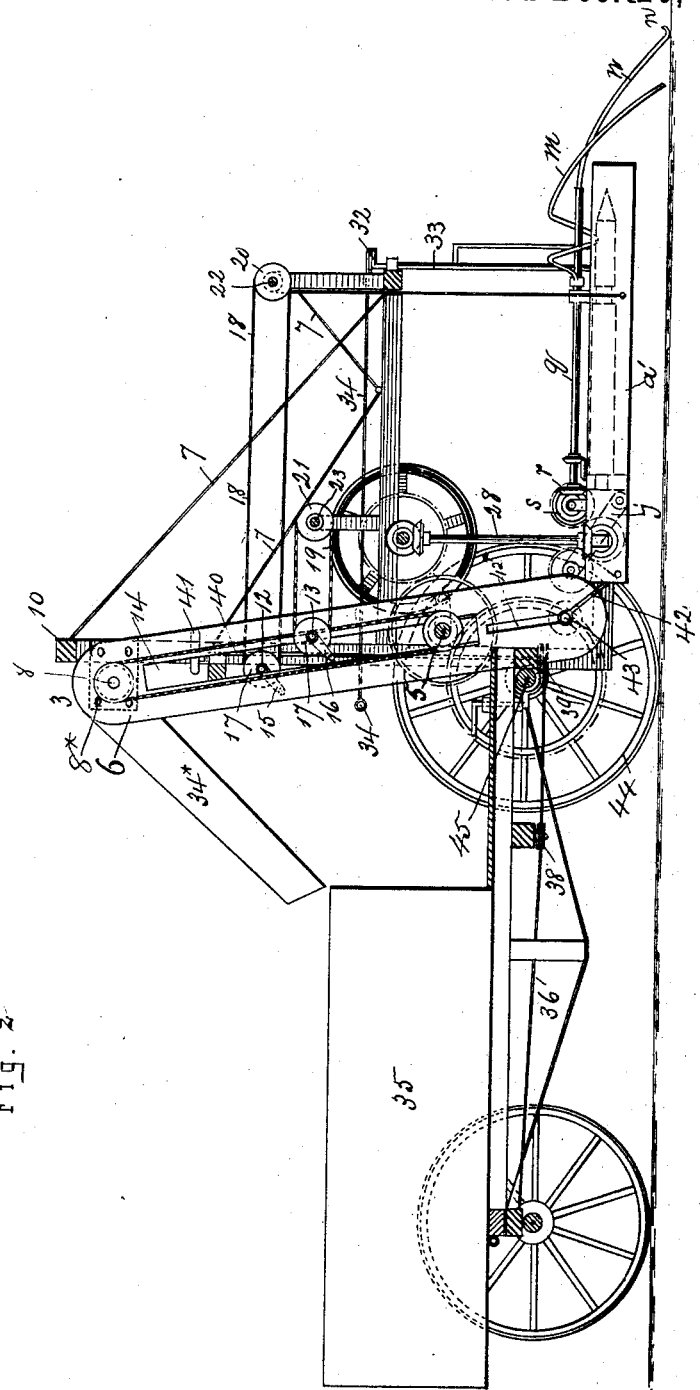
Figure 12:
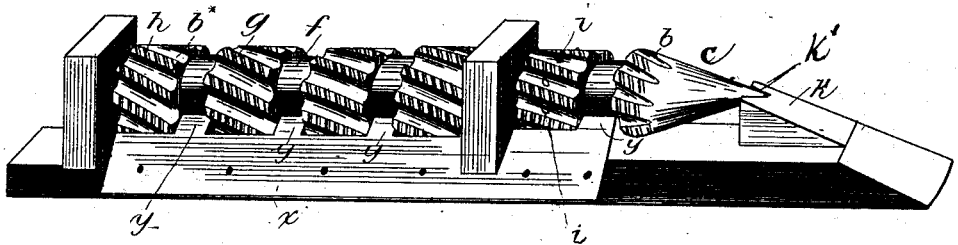
Figure 13:
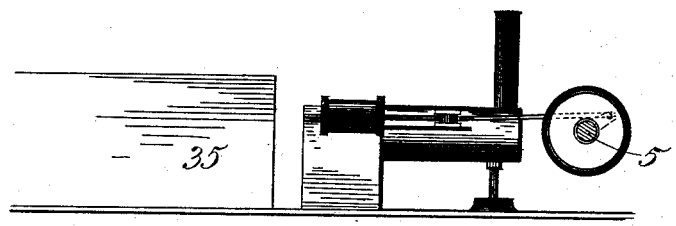

Figure 1 is a plan view of a machine embodying my improvements and arranged ready for work when to be driven by an engine; but when it is to be drawn by horses the small wheels shown in the rear are placed at the forward end, a little out of the longitudinal center, to suit the rows of corn to be gathered; Fig. 2, a longitudinal vertical section; Fig. 3, an enlarged detail view showing the picking and husking rollers and adjacent parts; Fig. 4, a detail, enlarged, of the gatherers and their connections; Figs. 5 and 6, a cross-section and a front view of the picking and husking rollers with adjacent parts; Figs. 7, 7*, cross-sections showing the devices for raising, lowering, and changing the positions of the roller-frames; Fig. 8, an elevation of the wheel-clutches and their connections; Figs. 9, 9*, enlarged views, in plan and end views, of the picking and husking rollers; Fig. 10, a detail, enlarged, of the endless chain and its arms for assisting in carrying back the picked ears; Fig. 11, a longitudinal section, enlarged, of the shaft and stock of the gatherers; Fig. 12, a detail showing one of the picking and husking rollers, its scraper, and half journal-box for its tapering end; and Fig. 13, a view showing an engine in its relation to the platform and corn-box.

The picking and husking rollers are shown at $a$ $a$, and their position and the means for actuating them are substantially the same as in my above-named patent; but their construction is essentially different. They are supported in the roller-frames $a'$ $a'$. The spiral grooves $b$ on the smaller and picking part $c$ of the rollers, which is forward of their front journal, $d$, are, say, six or eight in number as compared with twelve to eighteen spiral grooves, $b^*$, in the rearward or husking part, $e$, which part has a diameter larger than that of the part $c$. Each roller has annular grooves $f$, and each of the spiral teeth or ribs $g$ has shallow grooves $h$ cut in them, and which may be either at right angles to the axis or inclined, as desired. A number of short stout sharp-pointed plugs or studs, $i$, are firmly secured to the forward part of the rollers, substantially as shown in Fig. 9, and they are so located as to be opposite the annular grooves $f$ in the forward part of the adjacent roller. The objects of these annular grooves, shallow grooves, and plugs are as follows:

If a cornstalk is unusually large, it may not have sufficient room to slip easily in the space between the rollers; but by means of the spiral ribs or teeth $g$ the stalk is carried back till it enters one of the annular grooves $f$ and is drawn downward and out from between the rollers, while the ears of corn, being very much larger than the stalk, are, by the action of the rollers, picked off and carried rearward to the husking part $e$ of the rollers. It must be remembered that the parts $e$ of each coacting pair of rollers mesh to effect the husking and to carry the ear back to the apron $j$, which delivers it to the elevator; but the forward parts, $c$, being designed for picking, do not intermesh.

The object of the shallow grooves $h$ is to make the spiral teeth or ribs more effective in carrying the ears of corn rearward, and they also facilitate the passing of the husks downward and through between the rollers.

The object of the short stout pointed plugs $i$ is to dislodge the large stalks as they are drawn back into the annular grooves $f$ and to carry them down between the rollers and thus discharge them.

The annular grooves $f$ in one roller may alternate with those of its next adjacent or fellow roller of each pair, as shown in Fig. 9. In Figs. 3 and 12, at $k$, are shown what may be termed "half journal-boxes," preferably made of metal. These boxes are solid, and are solidly and firmly supported throughout their length and breadth, and have deep grooves $k'$ in their downward inclined tops, adapted for receiving the tips or points of the rollers, these grooves serving not only to protect all these points from lateral pull in either direction, and also from downward pull, but more especially to prevent the pulling away from each other of each pair of rollers. The tapering points of the picking part $c$ of the rollers run in these boxes, so that if a stalk should be dry, hard, or large these half boxes serve to hold the rollers rigidly and prevent their being pressed or forced apart, as otherwise would be their tendency.

Side boards, $l$, (see Fig. 6,) serve to catch the ears of corn that may happen to be thrown out sidewise, and when this occurs the ears are carried back onto the husking-rollers by the revolving worm or spiral part $m$ of the rake, presently to be described. These side boards extend from the forward end to the rearward end of the rollers, as seen in Figs. 2, 3, and 4.

The devices for gathering and picking up all the stalks that are lying down on the ground, whether such stalks lie lengthwise or crosswise of the rows in the field, are as follows. (See Figs. 2, 3, 4, 6, and 11.) Fixed or non-revolving teeth $n$, preferably of spring-steel, extend from the stock or rod $o$, and are bent downward, as shown, so as to be near the ground to pick up the fallen stalks, and their points $n'$ are turned up and flattened a little, so as to form a sort of shoe, and so that, if this point should chance to catch in the earth when the machine is advancing, its form will cause it readily to rise at once to the surface, instead of going downward. The revolving teeth, preferably of spring-steel, are shown at $m$. Each of them is of a spiral or worm shape at that end which connects with its revolving shaft $q$, and at its other end is of an arched form. The shaft $q$ is tubular and incloses the stock $o$. When the machine is in motion, the shaft $q$, with its tooth $m$, is caused to revolve by means of its gears $r$, driven by gear $s$, connected by interposed gearing with the driving-shaft. While the teeth $n$ pick up the stalks that are down and lie crosswise of the rows, the teeth $m$ not only pick up any that are down and that lie lengthwise of the rows, but they also catch and carry upward and rearward all the stalks that are picked up by the rakes or teeth $n$, thus delivering them to the picking and husking rollers in as good condition for treatment as if the stalks had been standing.

Referring to Figs. 5 and 6, $t$ is a division-board, the office of which is to prevent the ears of corn from getting crosswise of the pairs of rollers. This board is shown laterally enlarged in Fig. 6, and this enlargement extends rearward as far only as the rear end of the picking part $c$ of the rollers. The forward part, $u$, of this enlargement is shaped like a wedge, and extends forward beyond the point of the rollers for the purpose of splitting or dividing each row of corn, so that one-half of each row is picked and husked by one pair of rollers. The office of this enlargement is to throw the ears of corn over sidewise as they are drawn down against the picking-rollers, so as to cause a twisting action on them, instead of a straight pull, when they are picked off. If the ears as the machine advances were seized and pulled in a line or direction coinciding with the length of the ear, it is evident that it would be a dead straight pull and requiring an expenditure of great power for each ear, and which, multiplied by the number of ears being pulled at the same time, would be an injudicious waste of power and make the work so much more difficult for the team; but by causing the ears, as above stated, to be turned off or deflected sidewise when they are drawn down against the picking-rollers the latter seize them in such a manner as, in conjunction with the advancing movement of the machine, to give them a wrench or twist very much like that given them by hand when a person picks a single ear from its stalk. That part of this dividing-board that is placed between the husking part of the rollers—that is, back of the front journals, $d$—is in section shaped as shown at $v$ in Fig. 5, and extends from the forward journals to the rearward journals, $w$, of the rollers. Stationary scrapers $x$ (shown in Fig. 6 and in section in Fig. 5) extend from the front to the rear of these rollers $a$ and $a$. They are preferably made of wood and covered with plate iron or steel, and are placed near enough to the rollers to scrape off anything that may adhere to them, and tongues $y$, projecting from these scrapers, reach into all the grooves of each of the rollers and scrape them out at the same time that the general surfaces of the rollers are scraped. These tongues conform substantially to the form of the grooves $f$.

An endless chain, $z$, provided with any desired number of horizontally-projecting arms 1, and running over two sprocket-wheels, 2, (see Fig. 10,) performs the duty of assisting the rollers $a$ $a$ in carrying back the picked ears of corn to the apron $j$, which delivers them to the elevator 3. These aprons are of the usual kind, and are shown in Figs. 1, 2, 3, and 4. The elevator consists of two side boards and the usual belt. The side boards are slotted, as seen in side elevation in Fig. 2, to permit the adjusting-shafts 12 13 to pass through them. A crank-shaft, 5, (see Fig. 2,) also passes through them; but this crank is intended only for the attachment thereto of the ordinary crank-rod or other suitable part of an engine when one is used for operating the machine; but when horses are used for operating the machine the crank only is dispensed with, for the mechanism will be then actuated, as usual, from the carriage-wheels as the prime motor through gears and connections not needing any detailed description.

The elevator-frame 6 is supported by tie-rods 7. The lower end of the elevator is adjustable horizontally, but not vertically, and the upper end is practically stationary, simply hanging upon the journal-box of the top roller, 8, and sustained by an iron hanger, 8*, that is bolted to the cross-beam 10.

The means for raising and lowering the frame $a'$, in which the rollers $a$ $a$ are supported, are shown in Fig. 2, and are as follows: 12 13 represent two shafts passing through the slots 14 of the elevator side boards, and to each shaft are fastened the crank 15 or 16, respectively, and sprocket-wheels 17. From the sprocket-wheels and extending forward are two endless chains, 18 19, that operate other sprocket-wheels, 20 21, upon shafts 22 and 23, as shown in Figs. 2 and 7. Four spools, 24, are secured to each shaft, and to each spool a piece of chain, 25, is fastened. At the lower end each chain is securely fastened to a yoke, 26. The roller-frames are suspended—i. e., their weight is sustained—by these yokes. The object of the roller-frame raising and lowering device is to provide means whereby all the ears of corn may be gathered, whether they lie upon the ground or are high up on the stalks, and to enable the machine to pass easily over a portion of ground that happens to be a little higher than the general surface. The miter or bevel gears 27 are severally feathered upon the upright shafts 28, thus permitting the free use of the raising and lowering device by the operator at will.

Either the forward or rearward end of the roller-frame may, by means of the crank, be raised or lowered, as will be seen, independently of the other, or the whole frame may be raised or lowered bodily. The means for imparting motion to the husking and picking rollers not being claimed, need not be shown particularly. The same means may be employed as are shown and described in my patent, No. 235,038, hereinabove named, or any other well-known means.

A bracket or yoke, 28*, is provided for holding the bevel or miter gears 29 in position upon their shafts, and an arm, 30, is provided above the gears, through which the vertical shaft 28 passes, and which serves to hold the gears in mesh and as a journal-box for the vertical shaft, and both the yoke and arm are securely fastened to the yoke. The lower ends of the yokes are thus pivoted around the journal-boxes of the shaft, so as not to interfere with the gears of the vertical shaft when either end of the roller-frame is raised or lowered. As before stated, the gear upon the vertical shaft is feathered, so as to permit the roller-frame to be raised or lowered. This shaft also serves as a center-pin, by means of which the roller-frames may, while the machine is in motion, be swung either to the right or left, or inward toward each other, or outward from each other, for the purpose of enabling the operator to follow the rows of corn as they happen to be closer together or farther apart.

To enable the operator to swing the roller-frames, bell-crank levers 32 and their connecting-rods 33 are provided, as clearly shown in Figs. 1 and 3, the handles 34 of which extend rearward to within easy reach from the seat of the operator or driver. This seat is not shown. The lower and upper ends of the vertical shafts 28 are firmly journaled on the main frame, which rests upon the carrying-wheels, and because they are secured they constitute rigid center pins or axes, as before stated, upon which the roller-frames are swung.

The vertical connecting-rods 33, to which the bell-cranks or levers 32 are secured, are connected at their lower ends to the roller-supporting frames or yokes. (See Figs. 2 and 7.)

The ears of corn being delivered by the apron to the elevator are now carried upward by the latter over the top, where they are emptied into the spouts 34*, when by gravitation they fall into the general corn-box 35. This box 35 is arranged so as to permit of its being dumped as often as it is filled with corn, and it may be done at the side of the field or where it is found most convenient.

For turning the whole machine around, or for steering it, in case of its being propelled by an engine, means are provided, as shown in Fig. 1, consisting of a chain, 36, fastened to the axle 37 near each wheel, passing over guide-rollers 38 to and around a sprocket-wheel, 39, which is secured upon a vertical shaft, 40, and upon the upper end of the latter is secured a hand-wheel, 41, and by this hand-wheel the mechanism is operated. The relative position of the elevator and roller-frame is never changed, whether the latter be raised or lowered, and it is maintained by means of slots 42* in the side boards of the elevator and an iron connecting-rod, 42. The lower ends of these connecting-rods are firmly bolted to the roller-frame, and the upper ends are provided with studs 43, that are fitted to slide in the grooves 42* of the side boards, as shown in Fig. 2.

The truck-frame or wagon-frame is to be made strong and thoroughly trussed and braced, so as to withstand the racking and unequal strains that all machinery of this kind is likely to get.

The frame-work that sustains all the machinery, including the roller-frame, is constructed in the usual manner and thoroughly well braced and trussed, so as to render it as rigid as possible.

In Fig. 8 is shown a pair of wheels, 44, that fit loosely upon the axle 45. Each wheel is provided with a clutch, 46, that is thrown in or out of gear by means of levers 47, worked by the operator. The office of these wheels is to carry the machine, and when operated with horses they become the driving-wheels. The object of the clutches and loose wheels is to provide means whereby the whole machine may be more easily turned around or out of a straight line when advancing, because the wheel that is for the time being clutched or locked does not then revolve, and the point at which it rests on the ground thus becomes practically a center or pivotal point about which as a center the other wheel may travel; and when the machine is to be driven with an engine, by its connection with the crank 5 the clutches may be thrown out of gear, in which case the hubs of the wheels act as journal-boxes for the axle to run in, and the machine may then be used for husking corn—that is, in the stack or "shock." It then becomes a stationary instead of a locomotive machine; also, in Fig. 7, forward of the wheels and axle, is shown an iron frame, 48, shaped like the letter W. This furnishes a firm support, yet a little yielding fore and aft, for the mechanism that swings the roller-frames to the right or left. When an engine is employed, it may, if desired, be placed on the carriage-frame.

In Fig. 7, at the left hand, are shown sheet-metal shields 49, fastened to the yokes, but shown in dotted lines. The object of these is to prevent cornstalks from falling back into the husking-rolls.

I claim—

1. The described picking and husking rollers, provided with the annular grooves $f$, the spiral grooves $b\ b^*$, shallow grooves $h$ in the ribs $g$, pins or plugs $i$ in each roller, located opposite the grooves $f$ of its companion roller, and with a forward and a rear journal, substantially as shown and described.

2. The non-revolving teeth $n$, projecting downward and forward from their straight stock, and having their ends $n'$ upturned and flattened, combined with the revolving rake-teeth $m$, having the spiral and the terminal curve, as set forth, the stock of these revolving teeth being tubular and inclosing the stock of the teeth $n$, all substantially as shown and described.

3. In combination, the fixed rod $o$ and its teeth $n\ n'$, made as described, the tubular shaft $q$, inclosing the rod $o$ and carrying the spiral teeth $m$, and gears $s\ r$, for operating the tubular shaft and its teeth, all substantially as shown and described.

4. In a corn-husker adapted to be drawn by horses and to be operated by the revolution of its traction or carriage wheels, an engine carried on the frame, husking mechanism, a clutch for connecting the drive-wheels with the main axle, and a driving-crank adapted to be operated by the engine to actuate the husking mechanism when the carriage is stationary.

5. In a corn-harvester adapted to be drawn by horses and to be operated by the traction or carriage wheels, and provided, also, with a crank-shaft arranged to be driven, when desired, by an engine on the carriage-frame, the combination of such crank-shaft 5 and intermediate gears connecting it with the main shaft 45 of unclutching mechanism 46, whereby the carriage-wheels may be left inactive and the machine converted from a traveling and husking machine to a stationary machine for husking corn that is in the stack or shock.

6. In combination with the picking and husking rollers $a$, the half journal-boxes $k$, serving to hold the rollers at their tapering points beneath and at both sides and to prevent the rollers of each pair being forced apart from each other, all as set forth.

7. In combination with the picking and husking rollers, the dividing-board extending to the rear of the rollers and enlarged and wedge-shaped forward of the husking part of the rollers, and extending forward beyond the points of these rollers to split or divide each row of corn that one-half of each row may be picked and husked by one pair of rollers.

8. The described mechanism for raising and lowering the roller-frame, consisting of the shafts 22 and 23, operated by cranks, sprocket-wheels, and endless chains, substantially as set forth, pulleys 24, lifting-chains 25, and yokes 26.

9. In combination with the roller-frame, the vertical shaft serving as a center-pin upon which this frame may be swung to the right or left while the machine is in motion.

10. In combination with the roller-frame arranged to be raised and lowered, shaft 28, the miter-gear 27, feathered on said shaft, arm 30, yoke 26, and miter-gear 29, substantially as shown and described.

WARREN SPEAR.

Witnesses:
R. P. GOODWIN,
ALBERT G. DAILEY.